United States Patent Office

3,154,584
Patented Oct. 27, 1964

3,154,584
PROCESS FOR THE CATALYTIC REDUCTION OF DINITROTOLUENES
Cyril Gardner and Randal George Arthur New, Manchester, England, assignors to Imperial Chemical Industries Limited, London, England, a corporation of Great Britain
No Drawing. Filed Dec. 23, 1960, Ser. No. 77,860
Claims priority, application Great Britain, Jan. 1, 1960, 42/60
8 Claims. (Cl. 260—580)

This invention relates to an improved process for the catalytic reduction of organic nitrogen compounds, and more particularly to the catalytic reduction of dinitrotoluenes.

It has already been proposed to reduce catalytically an aromatic dinitro compound such as a dinitrotoluene to the corresponding diamine by slowly introducing the dinitro compound into an agitated suspension of palladium or platinum catalyst in an aqueous solution of the diamine at about 40° to 100° C., hydrogen being introduced to the reaction mixture at the same time. By the gradual addition of the dinitro compound to the reaction mixture and by using sufficient water to maintain the diamine in solution, this process has enabled the preparation of diaminotoluenes in excellent yield in the presence of water.

It has now been found that this process can advantageously be performed at temperatures higher than about 100° C. and thereby the reaction is accelerated and smaller amounts of catalyst are required and yet, surprisingly in view of the prior art relating to the catalytic reduction of nitro compounds, undesired side-reactions leading to the formation of charred products and even to explosion hazards do not arise to any significant extent.

Thus according to the present invention there is provided an improved process for the catalytic reduction of dinitrotoluenes to diaminotoluenes by gradually adding the dinitrotoluenes and hydrogen to a suspension of palladium or platinum catalyst in an aqueous solution of said diaminotoluenes, characterised in that the reaction is carried out at a temperature of from 110° to 140° C.

The process of this invention is particularly valuable for the reduction of 2:4- and 2:6-dinitrotoluenes and mixtures thereof: such mixtures may include small proportions of other dinitrotoluene isomers.

The platinum or palladium catalysts may be used in a highly divided state as described in the prior art, for example supported on an inert substrate such as carbon. Both platinum and palladium are more efficient catalysts and give better results in the reduction of dinitrotoluenes than such catalysts as nickel. Palladium is often preferred to platinum on economic grounds.

The proportion of catalyst used is usually such that from 15 to 150 parts by weight of palladium or platinum are present for every 1,000,000 parts by weight of total dinitrotoluenes to be reduced.

Conditions are preferably adjusted in a batchwise process so that the dinitrotoluene is reduced at approximately the same rate as that at which it is added. In the case of a continuous process, the rate of addition of the dinitrotoluenes is preferably adjusted so that the amount of dinitrotoluene present in the reaction medium is substantially constant throughout the reaction, dinitrotoluene being continuously added to, and the aqueous solution of the diamine product being continuously removed from, the reaction vessel.

The rate of addition of hydrogen is preferably adjusted so as to maintain a pressure of greater than 1 atmosphere absolute, preferably of from 1 to 10 atmospheres absolute in the reaction vessel.

Particularly good results leading to rapid conversion in good yield to clean products are obtained when the process of this invention is carried out at temperatures of between 115° and 125° C., and especially at about 120° C.

It has also been found that, as with conventional processes carried out at 40° to 100° C., the process of the present invention may be carried out using an aqueous alcoholic solution of the diamines. The use of aqueous alcohol instead of water alone is preferred since it enables the process to be operated with rather less vigorous agitation than is desirable for the process using an aqueous solution of diamine as the solvent, and with increased rates of addition of the dinitro compound. In the process of the present invention the hydrogenation is preferably carried out at such a rate that all the dinitrotoluenes present in the reaction medium are in solution. The use of aqueous alcohol enables a greater quantity of dinitrotoluenes to be held in solution than the use of water alone.

The aqueous alcoholic solvent usually contains between 10 and 800 parts of alcohol to each 100 parts of water, and preferably from 55 to 95 parts of alcohol to each 100 parts of water.

Examples of water-miscible alcohols for use in the aqueous alcoholic solvents include methanol, ethanol, n-propanol, isopropanol and tert.-butanol. Aqueous isopropanol is the preferred alcoholic solvent.

The invention is illustrated but not limited by the following examples in which parts and percentages are by weight.

*Example 1*

100 parts of a mixture of 2:4- and 2:6-dinitrotoluenes is fed continuously during 5½ hours into a stainless steel autoclave containing an agitated suspension of 1.7 parts of a 3% palladium on carbon catalyst in a mixture of 566 parts of tolylene diamines and 334 parts of water into which hydrogen is injected. The reaction temperature is 120° C. and the pressure 50 pounds per square inch gauge. At the end of the addition of dinitrotoluenes, the agitation and hydrogen flow are allowed to continue for a further 1½ hours in order to ensure complete removal by reduction of any trace of unconverted dinitrotoluene. The reaction mixture is filtered to remove spent catalyst and distilled to remove firstly water, and then the tolylene diamines. 636 parts of distilled tolylene-2:4- and -2:6-diamines are obtained, corresponding to a yield of 95% of theory calculated on the dinitroluene charged.

*Example 2*

1000 parts of a mixture of 2:4- and 2:6-dinitrotoluenes is fed continuously over 2½ hours into a stainless steel autoclave containing an agitated suspension of 1.7 parts of a 3% palladium on carbon catalyst in 443 parts of a mixture of 87% of isopropanol and 13% of water into which hydrogen is injected. The reaction temperature is 120° C. and the pressure is 50 pounds per square inch gauge. After completing the addition of dinitrotoluenes, passage of hydrogen and agitation is continued for a further 2½ hours to ensure complete conversion of the dinitrotoluenes. The reaction mixture is filtered to remove spent catalyst and then distilled to separate isopropanol, water and tolylene diamines. 324 parts of distilled tolylene-2:4- and -2:6-diamines are obtained corresponding to a yield, calculated on the dinitrotoluene converted, of 96.7% of theory.

What we claim is:
1. A process for the production of diaminotoluene by reducing dinitrotoluene which comprises gradually adding dinitrotoluene and hydrogen to a suspension of a catalyst selected from the group consisting of palladium and platinum in a solution of said diaminotoluene in a mixture of water and an alcohol selected from the group consisting of methanol, ethanol, n-propanol, isopropanol and tert.-butanol, at a temperature of about 110 to 140° C. and a pressure of about 1 to 10 atmospheres.

2. A process for the production of diaminotoluene as claimed in claim 1 wherein the dinitrotoluene is selected from the group consisting of 2:4-dinitrotoluene and 2:6-dinitrotoluene and mixtures thereof.

3. A process for the production of diaminotoluene as claimed in claim 1 wherein the proportion of catalyst used is such that from 15 to 150 parts by weight of said catalyst are present for every 1,000,000 parts by weight of total dinitrotoluenes to be reduced.

4. A process for the production of diaminotoluene as claimed in claim 1 wherein the reaction is carried out at a temperature of between 115° and 125° C.

5. A process for the production of diaminotoluene as claimed in claim 4 wherein the reaction is carried out at a temperature of about 120° C.

6. A process for the production of diaminotoluene as claimed in claim 1 wherein the solution contains between 10 and 800 parts of alcohol to each 100 parts of water.

7. A process for the production of diaminotoluene as claimed in claim 6 in which said solution contains from 55 to 95 parts of alcohol to each 100 parts of water.

8. A process for the production of diaminotoluene as claimed in claim 1 wherein the alcohol is isopropanol.

References Cited in the file of this patent

UNITED STATES PATENTS

| | | |
|---|---|---|
| 2,619,503 | Benner et al. | Nov. 25, 1952 |
| 2,976,320 | Winstrom et al. | Mar. 21, 1961 |

FOREIGN PATENTS

| | | |
|---|---|---|
| 768,111 | Great Britain | Feb. 13, 1957 |

OTHER REFERENCES

Paal et al.: Berichte Deutsche Chemische Gesellschaft, 1907, vol. 40, pp. 2209–2220.